April 4, 1950     I. M. MADDOX     2,503,163
MIRROR STRUCTURE
Filed Oct. 19, 1946
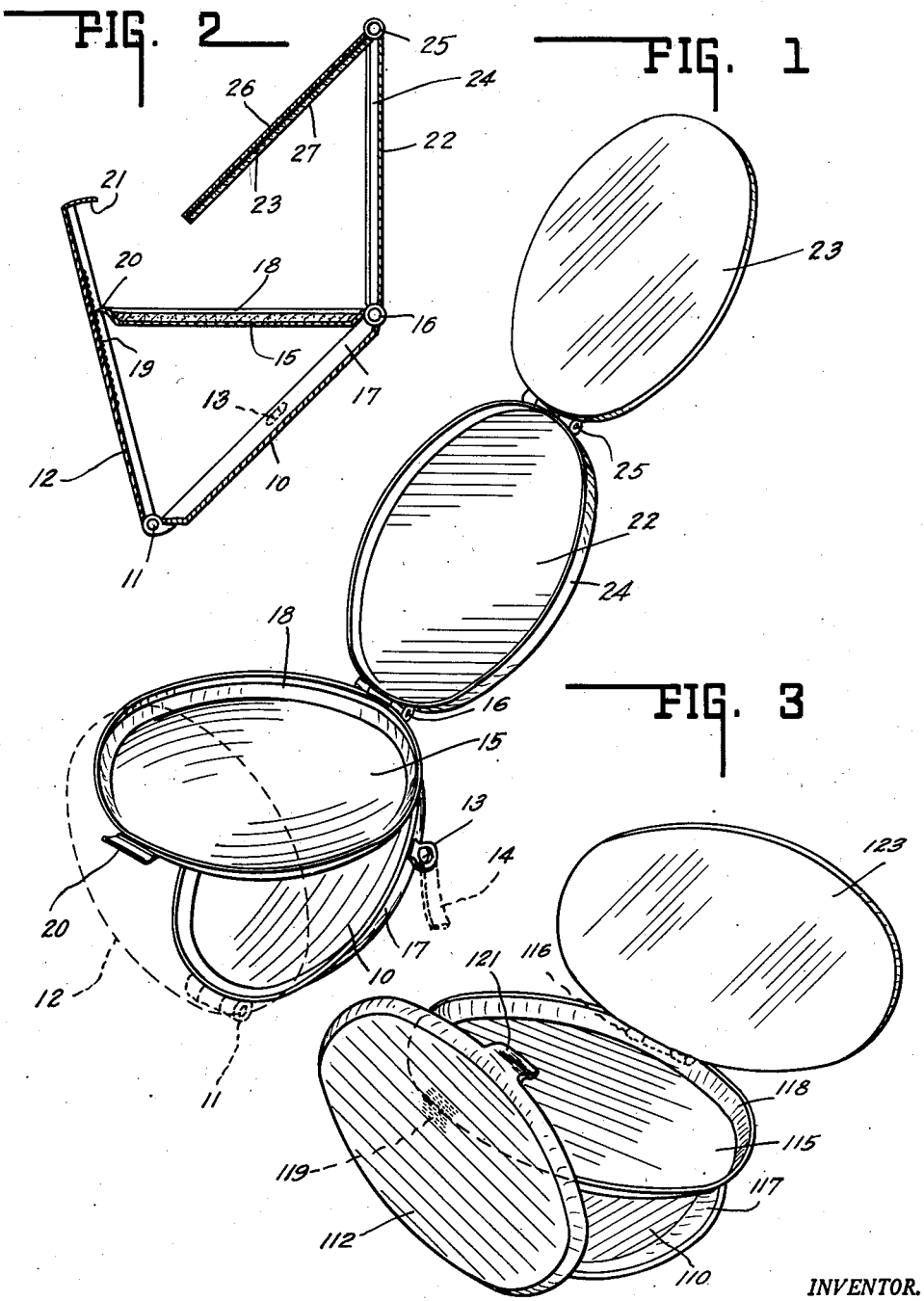
INVENTOR.
IRENE M. MADDOX.
BY
Lockwood, Goldsmith & Galt
ATTORNEYS.

Patented Apr. 4, 1950

2,503,163

UNITED STATES PATENT OFFICE 2,503,163

MIRROR STRUCTURE

Irene M. Maddox, Indianapolis, Ind.

Application October 19, 1946, Serial No. 704,441

4 Claims. (Cl. 132—83)

This invention relates to a mirror and its support.

One chief object of this invention is to provide a mirror and like structure that can be suitably supported by the person using same so that both hands may be free for hair dressing and like purposes.

Another chief object of this invention is to provide a mirror structure that is adjustable as required or desired.

A further chief object of this invention is to provide a mirror structure with a powder and puff container arrangement so that for makeup purposes the hands may be free, that is, are not required to hold such compact.

The chief feature of the invention resides in providing a mirror that can be enclosed, the casing structure being of multiple leaf type, the mirror being hingedly supported thereby.

Another feature of the invention resides in a triple leaf support for a mirror.

A further feature of the invention resides in the adjustment of such leaves for mirror adjustment, etc.

Still another feature of the invention resides in the friction hinging of the mirror to the container so that the two also are relatively adjustable.

Still a further feature of the invention resides in the container type support.

Other objects and features of the invention will be set forth more fully hereinafter.

The full nature of the invention will be understood from the accompanying drawings and the following description and claims.

In the drawings, Fig. 1 is a perspective view of one embodiment of the invention (and the compact type) with parts in extended relation, the top being shown dotted for clearness.

Fig. 2 is a central sectional view of the parts in one normal use position.

Fig. 3 is a perspective view of a second embodiment of the invention, parts being shown in a normal use position.

In Figs. 1 and 2 of the drawings there is illustrated the more complicated embodiment of the invention. In said figures there is illustrated a case having the bottom portion 10 hingedly connected as at 11 to a top portion 12.

At each side of portion 10 are suitable supports 13 to which may be connected opposite ends of a strap 14, chain, etc. When the case is opened and the strap is passed over the shoulders and behind the neck of the user the case bottom 12 will bear upon the chest of the user.

This strap, etc., is under tension and to prevent collapse toward closing there is provided a brace member 15. Herein the same is shown hingedly connected at 16 to bottom 10 having rim 17. Brace member 15 is of tray type having rim 18 to seat a powder pack, etc., not shown.

Since brace member 15 is hinged to bottom portion 10 opposite hinge 11, top portion 12 is suitably serrated or ridged as at 19 for selective association with complementary portion 20 carried by tray 15 opposite its hinge support. Thus the inclination of member 10 can be adjusted so that for any chest slope, tray 15 may be horizontally positioned if desired.

The other side of top 12 may have at 21 a friction latch or catch for holding the case closed when the several parts specified, as well as others to be described, are nested within said case.

Herein there is provided a mirror case 22 that serves as an adjustable support for mirror 23. Case 22 has rim 24 and therein may be nested mirror 23, the case and mirror having friction hinge connection as at 25.

The mirror case 22 is hingedly connected at 16 to the case bottom 10. Herein, for illustration purposes only, powder tray and brace member 15 has the same pivotal axis connection to the case as the mirror case.

The mirror 23 has one side 26 of reflecting character and the opposite side 27 is also of reflecting character. When the mirror is to be used for facial make-up purposes the parts are positioned as shown in Fig. 2.

When the wearer desires to dress the hair at the back of the head, mirror 23 can be tilted upwardly to present face 27 to wearer. Then when standing in front of another mirror, with the wearer's back thereto, the back of the head of the wearer will be visible in face 27. The hands obviously are free for hair dressing purposes. While uses of faces 26 and 27 have been described for different purposes, the uses may be reversed or either used for either purpose as found most expedient or necessary.

Reference will now be had to Fig. 3 wherein a simplified form of the invention is illustrated. Herein the parts are elliptical in outline instead of circular as illustrated in Fig. 1. Numerals of the one hundred series indicate parts like or similar to parts indicated by the primary series. The difference in the second embodiment is that brace member 115 is not of powder retention type, although it may be, and the mirror is hinged directly to case bottom instead of indirectly as shown in Figs. 1 and 2.

In both instances the mirror collapses inwardly into the structure case as well as the brace member. In Figs. 1 and 2 embodiment the mirror initially collapses into its case and then same collapses into the structure case. In this form also the mirror and mirror case hold in and to the tray 115 the powder and powder puff not shown.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a mirror including structure having a case having hingedly and directly connected top and bottom portions, one portion, when the case is opened, being adapted to rest upon the chest of the user, and tension means connected to the other portion remote from the hinge connection to support the case upon the user, the combination therewith of a brace member hingedly connected to the other of the portions remote from the hinge connection therebetween and having non-sliding operative bearing upon the chest engaging case portion for support purposes to prevent collapse of the portions toward closing, and a mirror operatively hinged to the said case portion connected to chest bearable portion, and tiltably adjustable for the purposes described, the mirror being nestable in the case when the latter is closed.

2. A mirror structure as defined by claim 1 wherein there is provided an intermediate leaf between the mirror and the case portion to which it is operatively hinged, the intermediate leaf having hinge connection with both.

3. A mirror structure as defined by claim 1 wherein the brace member is of tray type for powder retention purposes.

4. A mirror structure as defined by claim 1 wherein the brace member is of tray type for powder retention purposes and there is provided an intermediate leaf between the mirror and the case portion to which it is operatively hinged, the intermediate leaf having hinge connection with both and forming an internal cover for the tray member.

IRENE M. MADDOX.

REFERENCES CITED

The following references are of record in the file of this patent:

UNITED STATES PATENTS

| Number | Name | Date |
|---|---|---|
| 1,486,534 | Munn | Mar. 11, 1924 |
| 1,594,147 | Barrows | July 27, 1926 |
| 1,626,474 | Morrison | Apr. 26, 1927 |
| 1,992,523 | Dupret | Feb. 26, 1935 |
| 2,082,775 | Best | June 8, 1937 |
| 2,235,281 | Carver | Mar. 18, 1941 |
| 2,275,304 | Maurud | Mar. 3, 1942 |